United States Patent
Baglin et al.

(10) Patent No.: US 7,571,853 B2
(45) Date of Patent: Aug. 11, 2009

(54) DEVICE AND METHOD FOR SUPPLYING A DATA TRANSFER UNIT WITH ENERGY

(75) Inventors: Thomas Jean Ludovic Baglin, Rueil (FR); Albert Missoni, Graz (AT)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 11/129,068

(22) Filed: May 13, 2005

(65) Prior Publication Data

US 2005/0252972 A1   Nov. 17, 2005

Related U.S. Application Data

(63) Continuation of application No. PCT/DE03/03750, filed on Nov. 12, 2003.

(30) Foreign Application Priority Data

Nov. 19, 2002 (DE) ................. 102 53 920

(51) Int. Cl.
*G06K 7/08* (2006.01)
(52) U.S. Cl. .................. 235/451; 235/492
(58) Field of Classification Search ............. 235/451, 235/492, 486, 487, 380, 382, 441
See application file for complete search history.

(56) References Cited

U.S. PATENT DOCUMENTS

| 5,175,418 | A | * | 12/1992 | Tanaka ................ 235/439 |
| 5,262,712 | A | | 11/1993 | Klotzig et al. |
| 5,313,658 | A | * | 5/1994 | Nakamura ............. 455/69 |
| 5,426,667 | A | * | 6/1995 | van Zon ............... 375/219 |
| 5,805,998 | A | * | 9/1998 | Kodama ............... 455/462 |
| 5,850,187 | A | * | 12/1998 | Carrender et al. ...... 340/10.6 |
| 6,223,056 | B1 | * | 4/2001 | Appel ................. 455/561 |
| 6,275,681 | B1 | | 8/2001 | Vega et al. |
| 6,304,176 | B1 | | 10/2001 | Discenzo |
| 6,879,809 | B1 | * | 4/2005 | Vega et al. ............ 455/41.1 |
| 2005/0014477 | A1 | * | 1/2005 | Ballantyne ............ 455/127.3 |

FOREIGN PATENT DOCUMENTS

| DE | 41 04 274 A1 | 8/1992 |
| EP | 1 231 699 A1 | 8/2002 |
| JP | 11-126114 | 5/1999 |
| JP | 11-513518 | 11/1999 |
| JP | 2000-201442 A | 7/2000 |

* cited by examiner

*Primary Examiner*—Thien M Le
(74) *Attorney, Agent, or Firm*—Dickstein, Shapiro, LLP.

(57) ABSTRACT

Device for supplying a data transfer unit with energy, having an energy supply input via which the energy can be fed into the data transfer unit, and a decoupling unit for coupling and decoupling the energy supply input to and from the data transfer unit, wherein the decoupling unit decouples when a supply voltage for the data transfer unit leaves a tolerance range.

27 Claims, 3 Drawing Sheets

DEVICE AND METHOD FOR SUPPLYING A DATA TRANSFER UNIT WITH ENERGY

CROSS-REFERENCE TO RELATED APPLICATION

This application is a continuation of International Patent Application Serial No. PCT/DE2003/003750, filed Nov. 12, 2003, which published in German on Jun. 3, 2004 as WO 2004/047015, and is incorporated herein by reference in its entirety.

FIELD OF THE INVENTION

The invention relates to a device for supplying a data transfer unit, for example a chip of a smart card, with energy.

BACKGROUND OF THE INVENTION

In a smart card, it has become the case in the meantime that the communication, that is to say the transmission and reception of data, is effected contactlessly. It has also become the case in the meantime that the transmitter and the receiver of the smart card are supplied with energy contactlessly. The energy for supplying the transmitter and the receiver of the smart card is drawn from the electric field surrounding the smart card.

Since the trend is toward higher data transfer rates of up to 1 Mbit/s or higher and the current consumption in the chip rises at the same time, the requirements in the context of supplying the chip with energy also rise.

The data transfer is effected with the aid of high-frequency amplitude modulation. Data are transferred from the card reader to the chip, the chip then serving as a receiver, and data are also transferred from the chip to the card reader, the chip then serving as a transmitter. The card reader is quite often also referred to as a reader. At a data rate of 1 Mbit/s or higher in conjunction with a large current consumption of the chip, it becomes difficult, during the load modulation, that is to say during a data transfer from the chip to the card reader, to achieve a sufficiently large modulation swing with present-day systems. When the data transmitted by the card reader are received, it likewise becomes difficult to achieve a sufficiently large signal swing for the modulated signal to be clearly delineated from the noise and the disturbances of the coupling link or of the chip. In order to increase the identification accuracy, it is therefore advantageous to achieve a good signal-to-noise ratio.

An energy store for supplying energy to the chip is generally provided on the chip. If the capacitance of the energy store in the supply path is chosen to be very small, it is necessary to introduce a new concept for supplying energy to the chip during the field gaps as occur in the case of Type A mode of operation.

The term Type A transfer method is used hereinafter in the case of a modulation index of 100%.

The conventional method consists in concentrating energy from the field in a charge store, for example in a capacitance. This results in a DC voltage UDC, which is modulated onto a sawtooth-weightform voltage because the charging of the energy store and the discharging alternate with respect to time. If a Type A gap occurs, which means that e.g. for approximately 3 μs no clock pulse and no field are present, an energy source has to provide the load, that is to say the chip, with the energy required in this time.

The functional principle of the energy supply as known from the prior art is explained with reference to the block diagram shown in FIG. 1. The voltage UF generated from the field F charges a backup capacitance CS via a rectifier 1 during the field peaks. The charging time is generally very short in this case. Outside this short charging time, the backup capacitance CS ensures that energy is supplied to the chip. During the time duration in which the backup capacitance CS serves as an energy supply, it is discharged via a load resistance RL which symbolizes the load. If the load resistance RL is small, a large amount of energy and thus a high quantity of charge is drawn from the backup capacitance CS and the DC voltage UDC across the load resistance RL decreases rapidly in accordance with an exponential function. The smaller the backup capacitance CS, the faster the voltage UDC across the load resistance RL falls. The backup capacitance CS must be designed to be large enough that the voltage UDC does not fall below a minimum voltage in the time to be bridged. If a large backup capacitance CS is provided for this reason, although the voltage UDC does not fall below the minimum voltage, by the same token it becomes all the more difficult to charge the backup capacitance CS to the desired voltage UDC desired. The difficulty results from the fact that it is not possible to draw an arbitrary amount of energy from the field F. The quantity of energy which can be drawn from the field F is dependent, inter alia, on the transmission power of the card reader, the quality of the antenna of the card reader, the distance between the antenna of the card reader and the antenna of the chip and the quality of the antenna of the chip. In order that the energy balance is equalized, the field F must subsequently supply at least as much energy as the energy that is consumed by the load resistance RL.

A further method that is often used consists in adding a series regulator and a capacitance CH to the circuit in accordance with FIG. 1. The resultant device is shown in FIG. 2. With the aid of the rectifier 1, the voltage UF engendered by the field F is converted into a pulsating DC voltage UDC and smoothed with the aid of the capacitance CH. The series regulator 2, which does not have to have a good PSRR value in this case, generates a voltage UDC which is reduced relative to the voltage UF. Without a series regulator, the regulation of the voltage UDC must be undertaken by a parallel regulator.

Overall, care must be taken to ensure that the field F is not burdened by large energy stores, as constituted by the capacitance CH and the capacitance CS, via a low-impedance connection, formed for example by the rectifier 1. If large energy stores are connected to the field F in a low-impedance manner, data transfers with high data rates become impossible. Moreover, the dynamic range is reduced in this case even at low data rates.

The abovementioned problems arise with this device as well.

Both of the devices shown in FIGS. 1 and 2 have the disadvantage that, since the capacitance has to be chosen to be large, the useful signal swing and the dynamic range soon become too small during the data communication. The card reader is no longer able to distinguish the load modulation of the chip from disturbances from the field, which leads to a malfunction. Equally, on account of the low useful signal, the chip can no longer decode the data transmitted by the card reader. The dynamic range in the signal becomes too small. The useful signal is submerged in the noise and the data communication collapses.

In order to explain this relationship, FIG. 3 shows the profile of the voltage UF at the input of the rectifier 1 and the profile of the voltage UDC across the load resistance RL. For this purpose, the time t is plotted on the x axis and the amplitude of the voltage U is plotted on the y axis. The profile of the voltage UF at the input of the rectifier 1 is identified by the reference symbol 31. The broken line provided with the reference symbol 32 identifies the profile of the voltage UDC. The voltage UF falls at the instant t1 and does not rise again until the instant t2, which has the effect that the voltage UDC decreases continuously in the range between the two instants t1 and t2 due to the load RL and likewise increases again from the instant t2 up to the instant t3, namely as long as the voltage UF rises. It must be emphasized, however, that the voltage UDC no longer reaches its original value at the instant t3. The time periods t2-t3 and t4-t5 do not suffice to bring the voltage UDC in each case to its original value again. Rather, the voltage average of the voltage UDC decreases continuously. This ultimately has the effect that the card reader is no longer able to distinguish the load modulation of the chip from disturbances from the field and a malfunction thus occurs. Equally, on account of the low useful signal, the chip can no longer decode the data transmitted by the card reader.

SUMMARY OF THE INVENTION

It is an object of the invention, therefore, to specify a device for supplying a data transfer unit with energy in which the data transfer is ensured at any time.

The object is achieved by means of a device for supplying a data transfer unit with energy. The device has an energy supply input, via which the energy can be fed into the data transfer unit contactlessly, preferably by means of an electric field. Moreover, a decoupling unit for coupling and decoupling the energy supply input to and from the data transfer unit is provided, the decoupling unit being designed and being able to be operated in such a way that the decoupling is effected if the supply voltage for the data transfer unit leaves a tolerance range.

BRIEF DESCRIPTION OF THE DRAWINGS

The invention is explained in more detail below with reference to seven figures.

DETAILED DESCRIPTION OF PREFERRED EMBODIMENTS OF THE INVENTION

Figure 4:
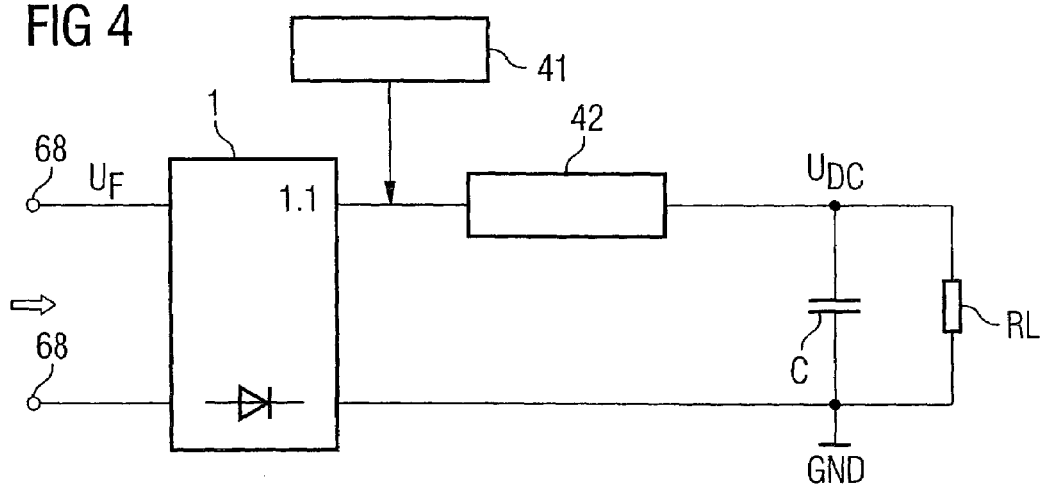
FIG. 4 shows a block diagram of a possible embodiment of the energy supply device according to the invention.

An embodiment of the invention's device for supplying a data transfer unit with energy is illustrated in principle in the block diagram in FIG. 4. Of course, the device according to the invention may also be used for supplying further components on the chip of the smart card. The voltage UF generated from the field F is present at the inputs 68 of the device. The inputs 68, also referred to as energy supply inputs, are connected to the inputs of a rectifier 1. On the output side, the rectifier 1 is connected to an energy store 41 and a decoupling module 42. Connected downstream of the decoupling module 42, in turn, are a capacitance C and also the load, symbolized by the load resistance RL. In this case, the load resistance RL and the capacitance C are arranged in parallel with one another.

An aim is for the field F not to be influenced by an energy store of the chip. For this reason, the field F is decoupled from the energy stores of the integrated circuit as required. If such an energy store is situated with a strong coupling in the field F, for example via a low-value resistor, a diode or the like, then only very little energy is permitted to be drawn from this energy store at least during the data communication. In order to achieve this, therefore, the decoupling module 42 is connected downstream of the rectifier 1. What is thus achieved is that the chip is always supplied with energy and, moreover, the field F is not burdened during the communication. The energy supply from the energy store is effected during a field gap, the voltage threshold from which the energy is supplied from an energy store to the load being precisely defined.

The decoupling module 42 keeps the voltage UDC at a constant potential. This can also be gathered from the profile of the voltage UDC in FIG. 7, which is identified by the reference symbol 72. For this purpose, the voltage at the input of the decoupling module 42 must be higher in order to permit a dynamic range in the field F.

Figure 5:
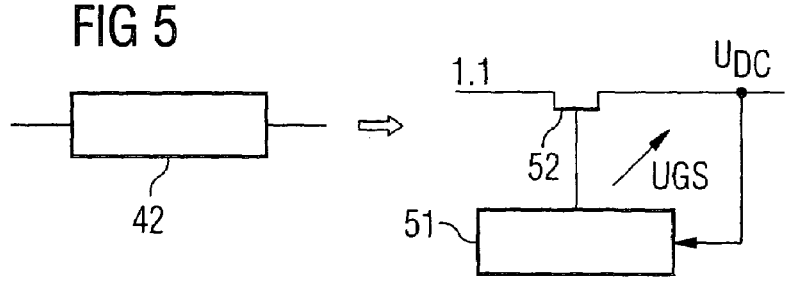
FIG. 5 shows a possible embodiment of a decoupling module as may be used in the device according to the invention.

The decoupling module 42 may be designed as in the embodiment shown in FIG. 5. In this case, the output 1.1 of the rectifier 1 is connected to an N-channel MOS transistor 52. By means of the N-channel MOS transistor 52, the gate-source voltage UGS and thus the voltage UDC is regulated in such a way that it remains constant and, consequently, dynamic fluctuations at the output 1.1 of the rectifier 1 are suppressed. The N-channel MOS transistor 52 is controlled by means of a control unit 51, at which, on the input side, the voltage UDC is present and which is connected, on the output side, to the control input of the N-channel MOS transistor 52. Only a modulation of the channel length of the N-channel MOS transistor 52 and a parasitic decoupling can have a disturbing effect on the gate of the N-channel MOS transistor.

Figure 6:
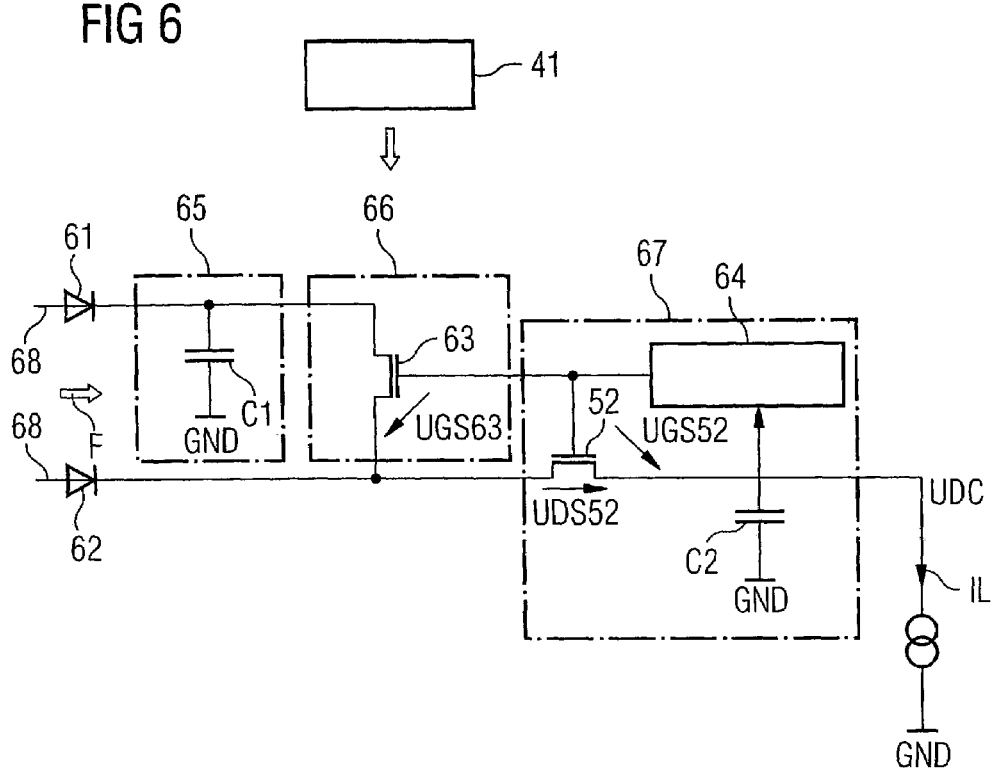
FIG. 6 shows a circuit diagram of a possible embodiment of the invention's device for supplying energy for a chip in a smart card.

FIG. 6 shows a circuit diagram of another embodiment of the device for supplying a data transfer unit with energy. The supply inputs 68 lead to two diodes 61 and 62, the cathodes of which are connected to the control outputs of a switching transistor 63. The cathode of the diode 61 is additionally connected to the energy store 65 in the form of a capacitance C1. The control input of the switching transistor 63 is connected both to the control input of the regulator transistor 52, also referred to as a series regulator, and to the output of the control unit for the series regulator 64. The capacitance C2, which is connected, on the one hand, to a reference-ground potential GND and, on the other hand, to the control output of the regulator transistor 52, the control input of the control unit 64 and the load, corresponds to the capacitance C shown in FIG. 4. In the block 67, the regulator is combined with the load energy store C2.

The functioning of the circuit shown in FIG. 6 is explained below. The series regulator 52 attempts, by means of the control unit 64, to keep the voltage UDC at a constant potential. The voltage UF engendered by the field F is greater than the sum of the voltages UDC+UDS52+approx. 100 mV, where UDS52 is the drain-source voltage of the transistor 52. This applies during normal operation, during the transmission of data from the chip to the card reader and during the reception of data with a modulation index of up to 14%. However, if the modulation index is greater than 14%, with the result that it thus no longer lies within the ISO tolerance, the voltage UF engendered by the field F falls to an extent such that the switching transistor 63 opens, that is to say is turned on. The energy stored in the energy store 65 and thus in the capacitance C1 flows via the switching transistor 63 and the series regulator 52 to the load. What is thus achieved is that the energy is no longer taken from the field F and, therefore, also no longer passes via the diode 62 and the series regulator 52 to the load.

With the aid of this circuit, the energy store 65 is available to the load only when additional energy is required. The energy is required when the field F has fallen to such a great extent that the chip can no longer be supplied by the field energy. This energy reserve from the energy store 65 is switched in very rapidly and supplies the corresponding energy depending on the current consumption of the load. The additional outlay on circuitry is advantageously very low. The circuit itself does not consume any additional current.

The realization actually requires only one NMOS transistor which has a larger current yield than the NMOS transistor of the series regulator 52.

The circuit is suitable both for 100% amplitude shift keying and for 10% amplitude shift keying data transfer.

Figure 1:
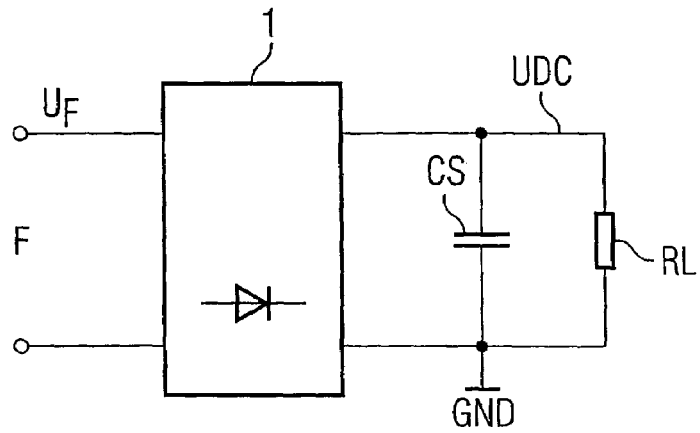
FIG. 1 shows a block diagram of a device for supplying energy for a chip in a smart card in accordance with the prior art.
Figure 2:
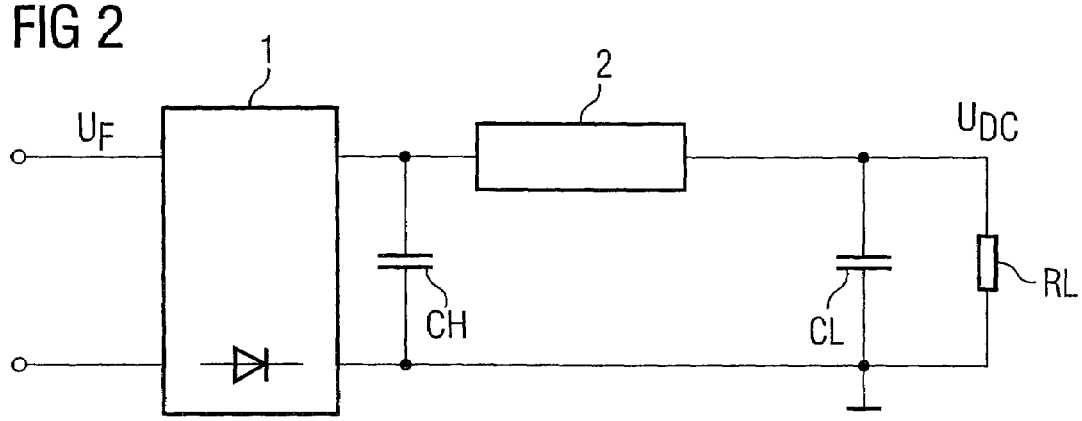
FIG. 2 shows a block diagram of a second device for supplying energy for a chip in a smart card in accordance with the prior art.
Figure 3:
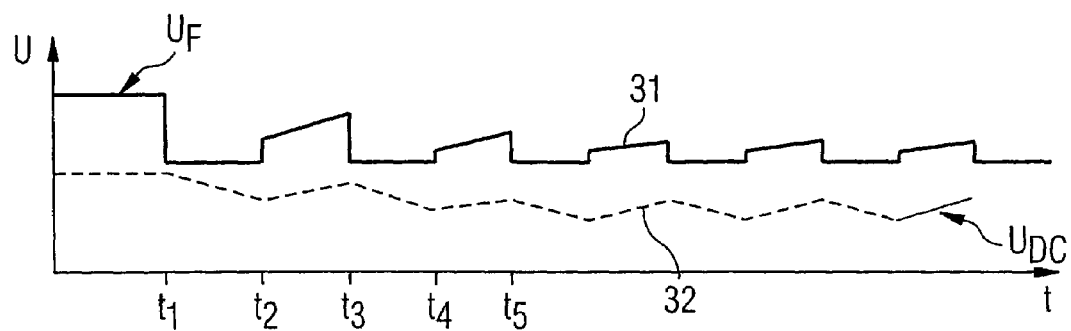
FIG. 3 shows the profiles of the voltage at the input and at the output of the energy supply device in accordance with the prior art.
Figure 7:
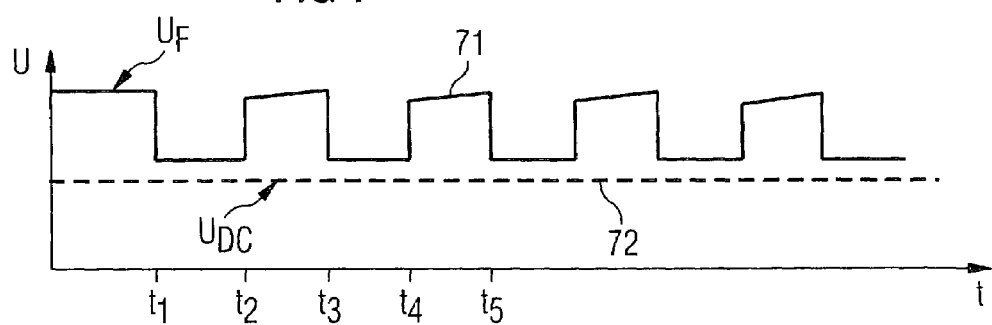
FIG. 7 shows the profiles of the voltage at the input and at the output of the energy supply device according to the invention.

With reference to the voltage profiles 71 and 72 shown in FIG. 7, where the reference symbol 71 identifies the profile of the voltage UF engendered by the field F and the reference symbol 72 with the broken line identifies the profile of the voltage UDC, it can be seen that the voltage UDC remains constant over the entire time duration. In contrast to the voltage profile 32 shown in FIG. 3, the voltage UDC does not fall over time in the case of the invention.

The previous description of the exemplary embodiments in accordance with the present invention serves only for illustrative purposes and not for the purpose of restricting the invention. In the context of the invention, various changes and modifications are possible without departing from the scope of the invention and its equivalents.

What is claimed is:

1. A device for supplying a data transfer unit with energy, comprising:
    an energy supply input unit configured to generate a first energy signal, which is fed contactlessly by means of an electric field, and to supply the first energy signal to the data transfer unit;
    an energy store unit configured to supply the data transfer unit with a second energy signal supplementing the first energy signal;
    a switch unit configured to switch the second energy signal to the data transfer unit; and
    a control unit configured to control the switch to connect the energy store unit to the data transfer unit via the switch unit, if the first energy signal voltage falls below a tolerance value.

2. The device as claimed in claim 1, wherein the energy store unit comprises a capacitance.

3. The device as claimed in claim 1, wherein the switch unit is an N-channel MOS transistor.

4. The device as claimed in claim 1, further comprising a diode connected between the energy supply input unit and the data transfer unit.

5. The device as claimed in claim 1, further comprising a further diode connected between the energy store unit and the energy supply input unit.

6. The device as claimed in claim 1, further comprising a series regulator, which is configured to keep the supply voltage of the data transfer unit constant.

7. The device as claimed in patent claim 6, wherein the series regulator comprises a transistor connected between the energy supply input unit and the data transfer unit.

8. The device as claimed in claim 1, further comprising a further capacitance connected in parallel with the data transfer unit.

9. The device as claimed in claim 1, wherein the tolerance value has a modulation index of at most 14%.

10. A device for supplying a data transfer means with energy, comprising:
    an energy supply input means for generating a first energy signal, which is fed contactlessly by means of an electric field, and for supplying the first energy signal to the data transfer means;
    an energy storage for supplying the device with a second energy signal supplementing the first energy signal;
    a switching means for switching the second energy signal to the data transfer means; and
    a control means for controlling the switching means to connect the energy storage means to the data transfer means via the switching means, if the first energy signal voltage falls below a tolerance value.

11. The device as claimed in claim 10, wherein the energy storage means comprises a capacitance.

12. The device as claimed in claim 10, wherein the switching means is an N-channel MOS transistor.

13. The device as claimed in claim 10, further comprising a diode connected between the energy supply input means and the data transfer means.

14. The device as claimed in claim 10, further comprising a further diode connected between the energy storage means and the energy supply input means.

15. The device as claimed in claims 10, further comprising a series regulating means for keeping the supply voltage of the data transfer means constant.

16. The device as claimed in claim 15, wherein the series regulating means comprises a transistor connected between the energy supply input means and the data transfer means.

17. The device as claimed in claim 10, further comprising a further capacitance connected in parallel with the data transfer means.

18. The device as claimed in claim 10, wherein the tolerance value has a modulation index of at most 14%.

19. A method for supplying a data transfer unit with energy, comprising:
    feeding a first energy signal contactlessly by means of an electric field into the data transfer unit via an energy supply input; and
    feeding a second energy signal, which supplements the first energy signal, by means of an energy storage unit into the data transfer unit if the supply voltage of the data transfer unit falls below a tolerance value,
    wherein the energy storage unit is connected to the data transfer unit via a switch, which is controlled by a control unit.

20. The method as claimed in claim 19, wherein the energy storage unit stores an electrical charge.

21. The method as claimed in claim 19, wherein the switch is realized by transforming an ohmic resistance.

22. The method as claimed in claim 19, wherein the first energy signal is controlled by a diode from the energy supply input to the data transfer unit.

23. The method as claimed in claim 19, wherein the second energy signal is controlled by a further diode from the energy storage unit to the energy supply input.

24. The method as claimed in claim 19, wherein the supply voltage of the data transfer unit is serially regulated to be kept constant.

25. The method as claimed in claim 24, wherein the serial regulation is realized by transforming an ohmic resistance between the energy supply input and the data transfer unit.

26. The method as claimed in claim 19, wherein a further energy storage unit is connected in parallel with the data transfer unit and stores an electrical charge.

27. The method as claimed in claim 19, wherein the tolerance value has a modulation index of at most 14%.

* * * * *